(12) United States Patent (10) Patent No.: US 7,757,278 B2
Boneh et al. (45) Date of Patent: Jul. 13, 2010

(54) METHOD AND APPARATUS FOR TRANSPARENT ENCRYPTION

(75) Inventors: Dan Boneh, Palo Alto, CA (US); Rajeev Chawla, Union City, CA (US); Alan Frindell, Mountain View, CA (US); Eu-Jin Goh, San Carlos, CA (US); Nagendra Modadugu, Menlo Park, CA (US); Panagiotis Tsirigotis, Mountain View, CA (US)

(73) Assignee: SafeNet, Inc., Belcamp, MD (US)

( * ) Notice: Subject to any disclaimer, the term of this patent is extended or adjusted under 35 U.S.C. 154(b) by 1027 days.

(21) Appl. No.: 10/038,169

(22) Filed: Jan. 2, 2002

(65) Prior Publication Data

US 2002/0112167 A1 Aug. 15, 2002

Related U.S. Application Data

(60) Provisional application No. 60/259,754, filed on Jan. 4, 2001, provisional application No. 60/259,786, filed on Jan. 4, 2001.

(51) Int. Cl.
*G06F 15/16* (2006.01)
(52) U.S. Cl. .............................. 726/12; 726/2; 726/26; 713/165; 713/193; 380/255
(58) Field of Classification Search ................ 713/193, 713/165, 189, 182, 171; 709/223; 726/2, 726/11, 12, 26, 27; 705/51, 64; 380/255; 707/705, 783
See application file for complete search history.

(56) References Cited

U.S. PATENT DOCUMENTS

| 4,386,416 | A | 5/1983 | Giltner |
| 4,964,164 | A | 10/1990 | Fiat |
| 5,142,272 | A | 8/1992 | Kondo |
| 5,222,133 | A | 6/1993 | Chou et al. |

(Continued)

FOREIGN PATENT DOCUMENTS

EP 0 946 018 B1 9/1999

(Continued)

OTHER PUBLICATIONS

U.S. Appl. No. 10/526,252, filed Feb. 24, 2005, Fountain et al.

(Continued)

*Primary Examiner*—Kimyen Vu
*Assistant Examiner*—Baotran N To
(74) *Attorney, Agent, or Firm*—Drinker Biddle & Reath LLP

(57) ABSTRACT

A method and apparatus are provided for protecting sensitive information within server or other computing environments. Numerous electronic requests addressed to a server system are received over network couplings and evaluated. The evaluation scans for sensitive information including credit card information and private user information. Upon detecting sensitive data, cryptographic operations are applied to the sensitive data. When the sensitive data is being transferred to the server system, the cryptographic operations encrypt the sensitive data prior to transfer among components of the server system. When sensitive data is being transferred from the server system, the cryptographic operations decrypt the sensitive data prior to transfer among the network couplings. The cryptographic operations also include hash, and keyed hash operations.

21 Claims, 6 Drawing Sheets

U.S. PATENT DOCUMENTS

| | | | |
|---|---|---|---|
| 5,463,702 A | 10/1995 | Trueblood | |
| 5,557,712 A | 9/1996 | Guay | |
| 5,734,744 A | 3/1998 | Wittenstein | |
| 5,764,235 A | 6/1998 | Hunt et al. | |
| 5,825,917 A | 10/1998 | Suzuki | |
| 5,828,832 A | 10/1998 | Holden et al. | |
| 5,848,159 A | 12/1998 | Collins et al. | |
| 5,923,756 A * | 7/1999 | Shambroom | 713/156 |
| 5,963,642 A | 10/1999 | Goldstein | |
| 5,999,629 A | 12/1999 | Heer et al. | |
| 6,021,198 A | 2/2000 | Anigbogu | |
| 6,061,448 A * | 5/2000 | Smith et al. | 380/282 |
| 6,073,242 A | 6/2000 | Hardy et al. | |
| 6,081,598 A | 6/2000 | Dai | |
| 6,081,900 A | 6/2000 | Subramaniam et al. | |
| 6,094,485 A | 7/2000 | Weinstein et al. | |
| 6,098,093 A | 8/2000 | Bayeh et al. | |
| 6,098,096 A | 8/2000 | Tsirigotis et al. | |
| 6,105,012 A * | 8/2000 | Chang et al. | 705/64 |
| 6,154,542 A | 11/2000 | Crandall | |
| 6,202,157 B1 | 3/2001 | Brownlie et al. | |
| 6,216,212 B1 | 4/2001 | Challenger et al. | |
| 6,233,565 B1 * | 5/2001 | Lewis et al. | 705/35 |
| 6,233,577 B1 | 5/2001 | Ramasubramani et al. | |
| 6,237,033 B1 * | 5/2001 | Doeberl et al. | 709/223 |
| 6,321,201 B1 | 11/2001 | Dahl | |
| 6,396,926 B1 | 5/2002 | Takagi et al. | |
| 6,397,330 B1 | 5/2002 | Elgamal et al. | |
| 6,442,607 B1 * | 8/2002 | Korn et al. | 709/225 |
| 6,473,802 B2 | 10/2002 | Masters | |
| 6,477,646 B1 | 11/2002 | Krishna et al. | |
| 6,502,135 B1 | 12/2002 | Munger et al. | |
| 6,519,365 B2 | 2/2003 | Kondo et al. | |
| 6,553,393 B1 | 4/2003 | Eilbott et al. | |
| 6,578,061 B1 | 6/2003 | Aoki et al. | |
| 6,584,567 B1 * | 6/2003 | Bellwood et al. | 713/171 |
| 6,587,866 B1 | 7/2003 | Modi et al. | |
| 6,598,167 B2 * | 7/2003 | Devine et al. | 713/201 |
| 6,615,276 B1 | 9/2003 | Mastrianni et al. | |
| 6,621,505 B1 | 9/2003 | Beauchamp et al. | |
| 6,640,302 B1 | 10/2003 | Subramaniam et al. | |
| 6,678,733 B1 | 1/2004 | Brown et al. | |
| 6,681,327 B1 | 1/2004 | Jardin | |
| 6,694,323 B2 | 2/2004 | Bumbulis | |
| 6,751,677 B1 | 6/2004 | Ilkicki et al. | |
| 6,757,823 B1 | 6/2004 | Rao et al. | |
| 6,763,459 B1 | 7/2004 | Corella | |
| 6,785,810 B1 * | 8/2004 | Lirov et al. | 713/165 |
| 6,874,089 B2 | 3/2005 | Dick et al. | |
| 6,886,095 B1 | 4/2005 | Hind et al. | |
| 6,898,577 B1 * | 5/2005 | Johnson | 705/51 |
| 6,915,427 B2 | 7/2005 | Maruyama et al. | |
| 6,941,459 B1 | 9/2005 | Hind et al. | |
| 6,963,980 B1 | 11/2005 | Mattsson | |
| 6,990,636 B2 | 1/2006 | Beauchamp et al. | |
| 6,990,660 B2 | 1/2006 | Moshir et al. | |
| 7,111,005 B1 * | 9/2006 | Wessman | 707/9 |
| 7,137,143 B2 | 11/2006 | Chawla et al. | |
| 7,152,244 B2 * | 12/2006 | Toomey | 726/26 |
| 7,266,699 B2 | 9/2007 | Newman et al. | |
| 7,272,229 B2 | 9/2007 | Nakano et al. | |
| 7,325,129 B1 | 1/2008 | Mattsson et al. | |
| 7,415,429 B2 * | 8/2008 | Rollins et al. | 705/27 |
| 2002/0012473 A1 | 1/2002 | Kondo et al. | |
| 2002/0015497 A1 | 2/2002 | Maruyama et al. | |
| 2002/0016911 A1 | 2/2002 | Chawla et al. | |
| 2002/0039420 A1 | 4/2002 | Shacham et al. | |
| 2002/0066038 A1 | 5/2002 | Mattsson | |
| 2002/0073232 A1 | 6/2002 | Hong et al. | |
| 2002/0087884 A1 | 7/2002 | Shacham et al. | |
| 2002/0100036 A1 | 7/2002 | Moshir et al. | |
| 2002/0112167 A1 | 8/2002 | Boneh et al. | |
| 2003/0014650 A1 | 1/2003 | Freed et al. | |
| 2003/0039362 A1 | 2/2003 | Califano et al. | |
| 2003/0046572 A1 | 3/2003 | Newman et al. | |
| 2003/0065919 A1 | 4/2003 | Albert et al. | |
| 2003/0097428 A1 | 5/2003 | Afkhami | |
| 2003/0101355 A1 | 5/2003 | Mattsson | |
| 2003/0123671 A1 | 7/2003 | He et al. | |
| 2003/0156719 A1 | 8/2003 | Cronce | |
| 2003/0197733 A1 | 10/2003 | Beauchamp | |
| 2003/0204513 A1 | 10/2003 | Bumbulis | |
| 2004/0015725 A1 | 1/2004 | Boneh et al. | |
| 2004/0255140 A1 | 12/2004 | Margolus et al. | |
| 2005/0004924 A1 | 1/2005 | Baldwin | |
| 2006/0041533 A1 | 2/2006 | Koyfman | |
| 2006/0149962 A1 | 7/2006 | Fountain et al. | |
| 2007/0074047 A1 | 3/2007 | Metzger et al. | |
| 2007/0079140 A1 | 4/2007 | Metzger et al. | |
| 2007/0079386 A1 | 4/2007 | Metzger et al. | |

FOREIGN PATENT DOCUMENTS

| | | |
|---|---|---|
| WO | WO 01/03398 | 1/2001 |
| WO | WO 02/101605 | 12/2002 |

OTHER PUBLICATIONS

U.S. Appl. No. 10/850,827, filed May 20, 2004, Koyfman.
U.S. Appl. No. 11/236,046, filed Sep. 26, 2005, Metzger et al.
U.S. Appl. No. 11/236,294, filed Sep. 26, 2005, Metzger et al.
U.S. Appl. No. 11/236,061, filed Sep. 26, 2005, Metzger et al.
Alteon Web Systems: "The Next Step in Server Loading Balancing" Nov. 1999, Retrieved from the Internet: URL:http:/www.nortelnetworks.com/products/librarv/collateral/intel_int/webworking_wp.pdf, Retrieved on Mar. 2, 2004; pp. 4-11.
Alteon Web Systems: "Networking with the Web in Mind" May 1999, Retrieved from the Internet: URL:http://www.nortelnetworks.com/products/librarv/collateral/intel_int/webworking_wp.pdf, Retrieved on Mar. 2, 2004; p. 1, pp. 3-7.
Boneh, D., "Twenty Years of Attacks on the RSA Cyrptosystem," Notices of the AMS, vol. 46, No. 2, pp. 203-213, 1999.
Boneh, et al., "An Attack on RSA Given a Small Fraction of the Private Key Bits," ASIACRYPT '98, LNCS 1514, pp. 25-34, 1998.
Boneh, et al., "Cryptanalysis of RSA with Private Key $d$ Less than $N^{0.292}$," (extended abstract), 1999.
Boneh, et al., "Efficient Generation of Shared RSA Keys," (extended abstract).
Durfee, G., et al., "Cryptanalysis of the RSA Schemes with Short Secret Exponent from Asiacrypt '99," ASIACRYPT 2000, LNCS 1976, pp. 14-29, 2000.
Fiat, A. "Batch RSA, (digital signatures and public key krypto-systems)" Advances in Crytology—Cryto '89 Proceedings Aug. 20-24, 1989, Springer-Verlag.
Großschädl, J., et al., "The Chinese Remainder Theorem and its Application in a High-Speed RSA Crypto Chip," 2000.
Herda, S., "Non-repudiation: Constituting evidence and proof in digital cooperation," Computer Standards and Interfaces, Elsevier Sequoia, Lausanne, CH, 17:1 (69-79) 1995.
Immerman, N., "Homework 4 with Extensive Hints," 2000.
Menezes, A., et al., "Handbook of Applied Cryptography," 1996 CRC Press, pp. §8.2-§8.3 and §14.5.
Netscape; "Netscape Proxy Server Administrator's Guide, Version 3.5 for Unix"; Feb. 25, 1998; Retrieved from the Internet.
Oppliger, R.; "Authorization Methods for E-Commerce Applications"; 1999.
RSA Laboratories: "PKCS #7: Cryptographic Message Syntax Standard, Version 1.5," RSA Laboratories Technical Note, pp. 1-30, Nov. 1, 1993.
RSA "PKCS #1 v2.0 Amendment 1: Multi-Prime RSA," 2000.
"Security Protocols Overview (An RSA Data Security Brief)", RSA Data Security, 1999, http://www.comms.scitech.susx.ac.uk/fft/crypto/security_protocols.pdf, pp. 1-4.

Schacham, H., et al., "Improving SSL Handsake Performance via Batching," Topics in Cryptology, pp. 28-43, 2001.

Shand, M., et al., "Fast Implementations of RSA Cryptography," 1993.

Sherif, M.H., et al., "SET and SSL: Electronic Payments on the Internet," IEEE, pp. 353-358 (1998).

Stallings, W., "IP Security," Network Security Essentials, Applications and Standards, Chapters 6 and 7, pp. 162-223, 2000.

Takagi, T., "Fast RSA-Type Cryptosystem Modulo $p^k q$," 1998.

Takagi, T., "Fast RSA-Type Cryptosystems Using N-Adic Expansion," Advances in Technology—CRYPTO '97, LNCS 1294, pp. 372-384, 1997.

Wiener, M., "Cryptanalysis of Short RSA Secret Exponents," 1989.

U.S. Appl. No. 11/341,060, filed Jan. 27, 2006, Metzger et al.

Wagner, Neal R., "The Laws of Cryptography": The RSA Cryptosystem, <http://www.cs.utsa.edu/~wagner/laws/RSA.html>.

* cited by examiner

METHOD AND APPARATUS FOR TRANSPARENT ENCRYPTION

RELATED APPLICATIONS

This application claims the benefit of U.S. Patent Application Nos. 60/259,754 and 60/259,786 filed Jan. 4, 2001, Ser. Nos. 09/877,302 and 09/877,655 filed Jun. 8, 2001, and Ser. No. 09/901,350 filed Jul. 9, 2001, all of which are currently pending.

TECHNICAL FIELD

The claimed invention relates to the field of data security. In particular, the claimed invention relates to securing sensitive user data in a server system.

BACKGROUND

World Wide Web sites, or web sites, dealing with secure content use various mechanisms to protect this content. For example, electronic commerce, or e-commerce, web sites use a variety of mechanisms to protect user credit card numbers and user passwords. Most often, these sites use the Secure Socket Layer (SSL) protocol to protect all sensitive data while it is in transit on the Internet among customer computers and browsers and the web site.

The SSL is a typical security protocol used on the web. The SSL protects data while it is in the network by encrypting it using a session-key known only to the web server and the client computer. The data is decrypted as soon as it reaches the web server. The web server processes the data (e.g., validating the credit card number) and then often stores it in a server database.

Unfortunately, however, many web servers store sensitive data in the clear, or in an unencrypted state, in an associated server database. As a result, this database is a prime target for hackers. Hackers have broken into web server databases, thereby compromising many credit card numbers and private user/customer information. These compromises are expensive for both electronic retailers and their customers.

While SSL protects transitory data in the network, it does not protect data once it reaches a web site and while it resides on the associated web servers. A different architecture is needed to protect data at the server site. Indeed, web sites should ensure that sensitive data stored in their database is always encrypted. However, any such system must permit efficient communication and not create bottlenecks that will annoy or discourage users of the network. If a security system does create bottlenecks, it could discourage or divert customers from the web site.

BRIEF DESCRIPTION OF THE FIGURES

The accompanying figures illustrate embodiments of the claimed invention. In the figures:

Figure 1:
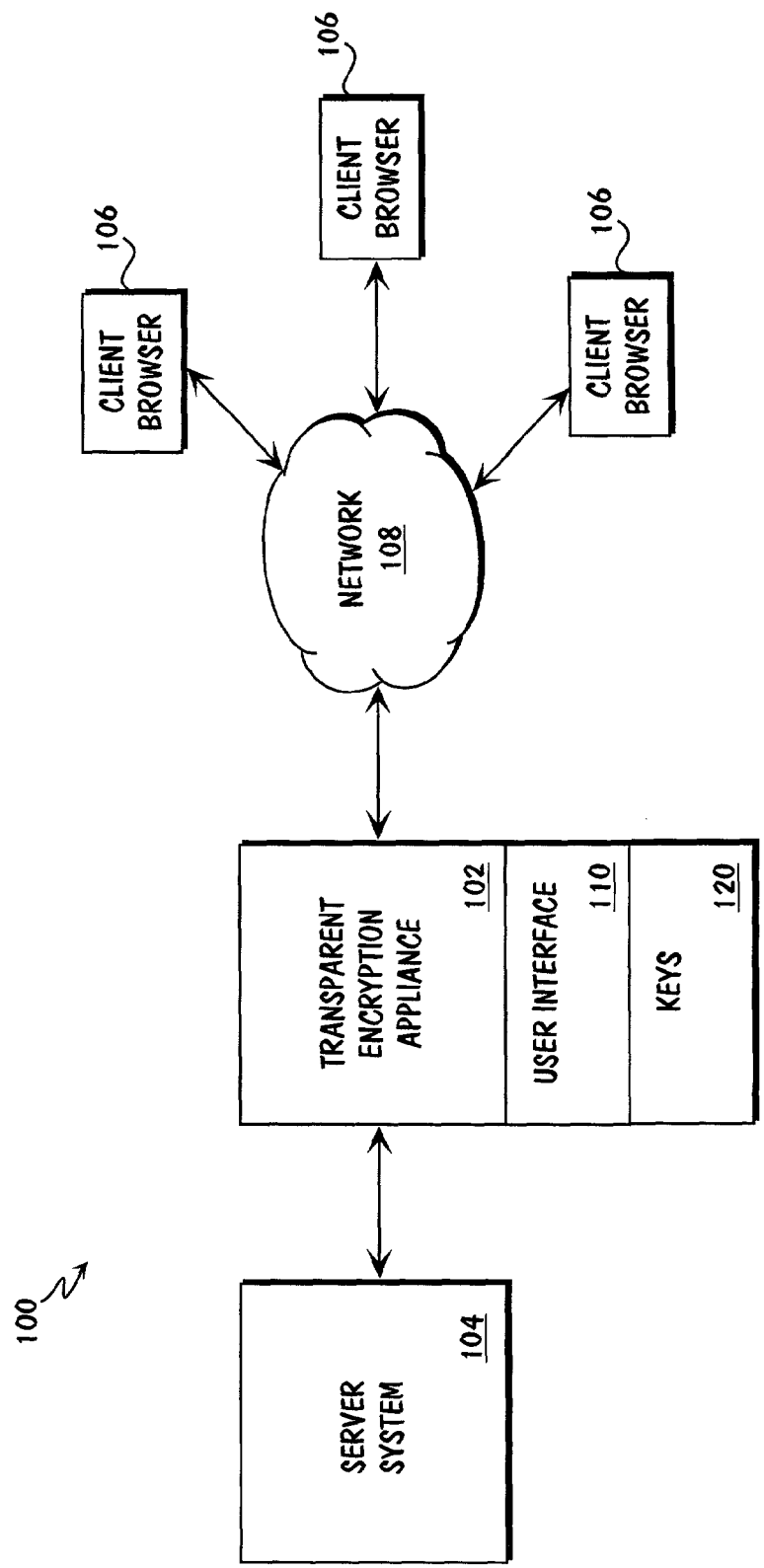
FIG. 1 is a block diagram of a system architecture including a Transparent Encryption Appliance, under one embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 108 is first introduced and discussed with respect to FIG. 1).

Any headings used herein are for convenience only and do not affect the scope or meaning of the claimed invention.

DETAILED DESCRIPTION OF THE ILLUSTRATED EMBODIMENTS

A method and apparatus are provided for transparently protecting sensitive data within a server system or environment. Data entering and leaving a server site are evaluated for sensitive data. The sensitive data includes, e.g., credit card numbers and information, account numbers and information, and any other personal information of a customer or user that is of a sensitive nature, including birth date, social security number, and information related to user passwords. Upon detection of sensitive data, cryptographic operations are applied to the data. Cryptographic operations include encrypting sensitive data transferred to the server system. Cryptographic operations also include decrypting encrypted sensitive data transferred from the server system en-route to a third party system. Further, cryptographic operations include hashing and keyed hashing of password data received at the server system. Moreover, cryptographic operations provide integrity for cookies.

The transparent protection is provided in an appliance of an embodiment that is separate from the server equipment. This appliance is coupled to the server systems and the data networks so that the server systems require no modification. In this manner, web site operators can install the appliances between their servers and the associated network connections without installing new hardware or software or modifying existing hardware or software on their servers.

In the description herein, numerous specific details are included to provide a thorough understanding of, and enabling description for, embodiments of the invention. One skilled in the relevant art, however, will recognize that the invention can be practiced without one or more of the specific details, or with other fields, expressions, methods, etc. In other instances, well-known structures or operations are not shown, or are not described in detail, to avoid obscuring aspects of the invention.

Figure 2:
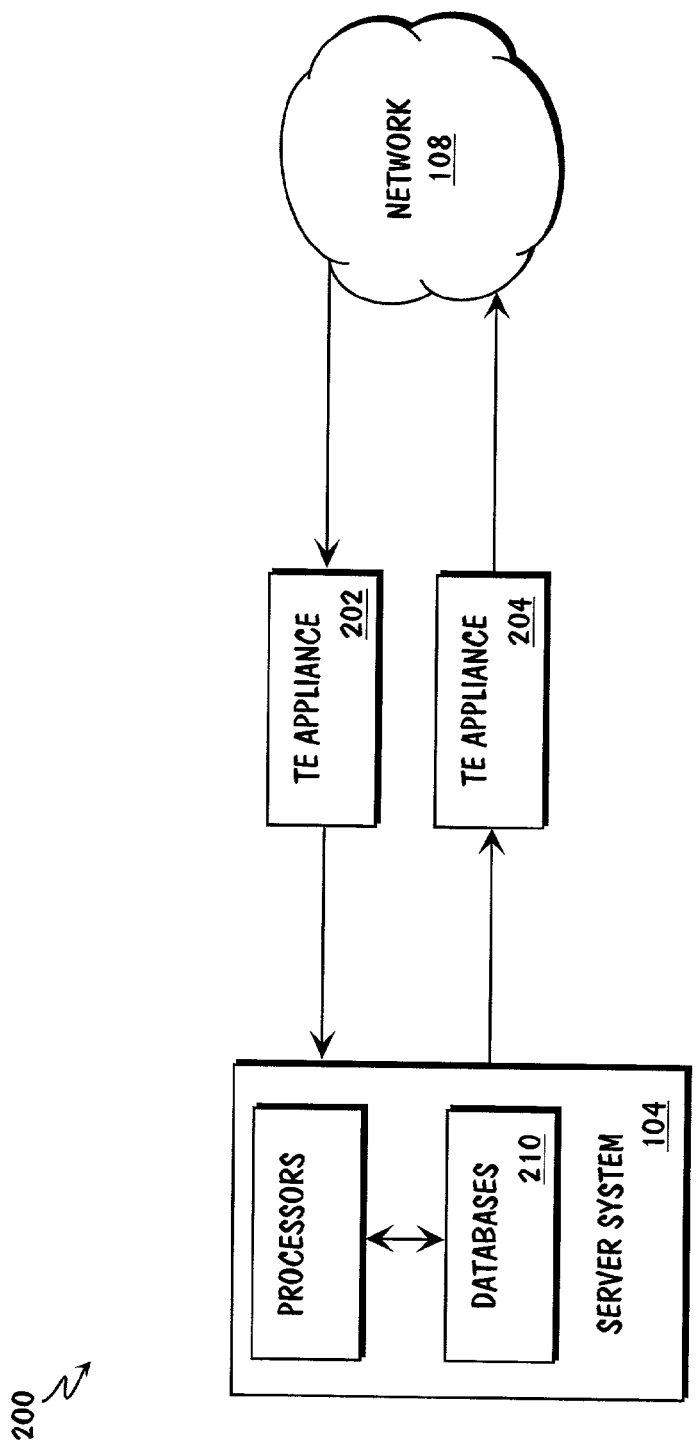
FIG. 2 is a block diagram of a system architecture including Transparent Encryption Appliances, under an alternate embodiment.

Unless described otherwise below, the construction and operation of the various blocks shown in FIGS. 1 and 2 are of conventional design. As a result, such blocks need not be described in further detail herein, because they will be understood by those skilled in the relevant art. Such further detail is omitted for brevity and so as not to obscure the detailed description of the invention. Any modifications necessary to these blocks, or other embodiments, can be readily made by one skilled in the relevant art based on the detailed description provided herein.

Each of the blocks depicted in the flowchart herein is of a type well known in the art, and can itself include a sequence of operations that need not be described herein. Indeed, unless described otherwise herein, the blocks depicted in the Figures are well known or described in detail in the above-noted and cross-referenced patent applications. Indeed, much of the detailed description provided herein is explicitly disclosed in the provisional patent applications; most or all of the additional material of aspects of the invention will be recognized by those skilled in the relevant art as being inherent in the detailed description provided in such provisional patent applications, or well known to those skilled in the relevant art. Those skilled in the relevant art can implement aspects of the invention based on the flowchart of FIG. 3 and the detailed description provided in the patent applications. For example, those skilled in the relevant art can create source code, microcode, program logic arrays or otherwise implement aspects of the invention based on these flowchart and the detailed description provided herein. Any routines may be stored in non-volatile memory (not shown) that forms part of an associated processor, or can be stored in removable media, such as disks, or hardwired or preprogrammed in chips, such as EEPROM or flash semiconductor memory chips.

Those skilled in the relevant art will appreciate that the routines and other functions and methods described herein can be performed by or distributed among any of the components described herein. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

The Secure Socket Layer ("SSL") is a protocol that uses a significant amount of host server computing power. Many web sites use a security appliance or specially designed hardware device to manage the SSL traffic in order to offload some SSL work from the web servers. The security appliance is used coupled between the web server and the network connections, and handles the computations that support SSL connections.

A Transparent Encryption Appliance ("TE Appliance") is provided that provides backend database security at a web site, thereby protecting sensitive customer data stored and managed by the host web site systems and servers. The TE Appliance provides enhanced functionality in the form of transparent encryption to a security appliance.

FIG. 1 is a block diagram of a system architecture 100 including a TE Appliance 102, under one embodiment. The TE Appliance 102 is coupled to a host web site or server system 104, and to numerous client computers and browsers 106 via at least one network 108. The network 108 includes the Internet as well as other wired, wireless, and hybrid network types, and may include independent networks, proprietary networks, or back plane networks, but is not so limited. Data transferred between the client computers 106 and the server system 104 passes through the TE Appliance 102. This includes both cleartext transactions, or Hypertext Transfer Protocol ("HTTP") transactions, and encrypted (SSL) transactions, as explained below. The TE Appliance may include a user interface 110. Also, the TE Appliance may include keys 120 of differing types.

FIG. 2 is a block diagram of a system architecture 200 including Transparent Encryption Appliances 202 and 204, under an alternate embodiment. A first TE Appliance 202 is coupled to receive data transferred from numerous client computers and browsers (not shown) via the network 108. The received data is encrypted or hashed by the first TE Appliance 202, as appropriate to the type of data received, and the encrypted or hashed data is provided to the server system 104. As such, only encrypted or hashed data is available within the server system, in particular, in server system databases 210.

A second TE Appliance 204 is coupled to receive data transferred from the server system 104 to third party or other electronic systems (not shown) via the network 108. The data requested by the third party system is decrypted by the second TE Appliance 204.

The functionality provided by the TE Appliances of both embodiments can be hosted on dedicated network appliances as shown in FIGS. 1 and 2, but is not so limited. The transparent encryption functions can also be performed by, or distributed among any combination of, the host web site server systems 104 and 208, numerous client processing devices and browsers 106 coupled to the network, and any of the associated network components.

The TE Appliance of an embodiment can reside at the same physical location as the server systems that it supports or at different physical locations. Further, a TE Appliance may be configured to provide support to multiple server systems. It is also possible that the functions provided by the TE Appliance of an embodiment are distributed among numerous processing devices at numerous physical locations.

Figure 3:
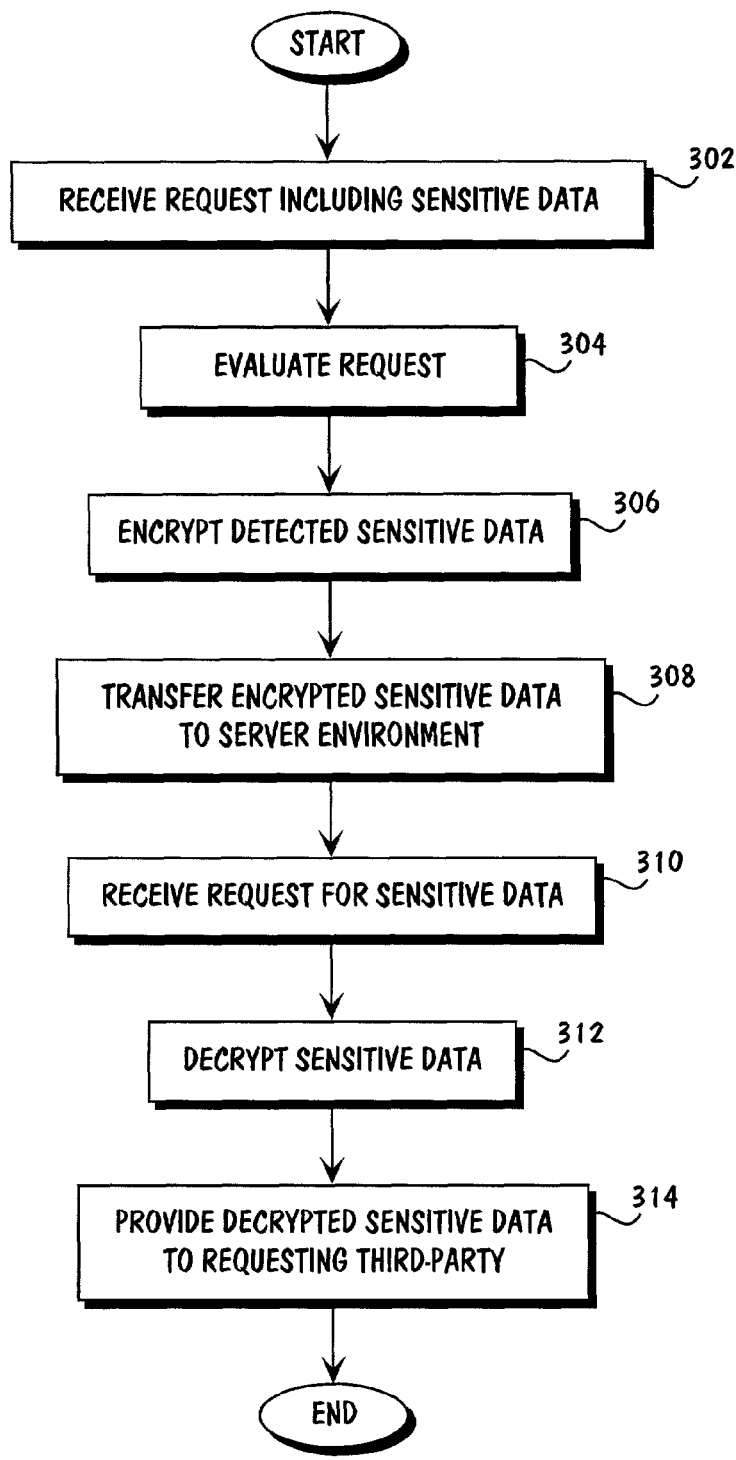
FIG. 3 is a flow diagram of transparent encryption used in the embodiments.

FIG. 3 is a flow diagram of transparent encryption of both embodiments. In operation, the TE Appliance receives electronic transaction queries from client browsers and other electronic systems in block 302. The TE Appliance, in block 304, evaluates the requests entering the site. The evaluating or scanning functionality works with typical web encodings including Uniform Resource Identifier ("URI") encoding and Extensible Markup Language ("XML") encoding, but is not so limited. When the TE Appliance identifies tags indicating that the associated data is sensitive, it applies an appropriate cryptographic operation to the data within these tags, in block 306. For example, incoming sensitive data is encrypted using known encryption algorithms such as know public key infrastructure ("PKI") encryption algorithms or the Data Encryption Standard ("DES"). The resulting data is then, in block 308, routed to the appropriate component of the backend system or network.

The server environment, and the corresponding TE Appliances, also receive electronic information requests for sensitive data from third-party systems, in block 310, via network couplings with the third-party systems. For example, in the case of a purchase transaction, sensitive information including credit card information would have to be cleared with a financial institution before approving the purchase transaction. Upon receiving the request, encrypted sensitive data is retrieved and decrypted, in block 312. Once decrypted, the sensitive information is provided to the requesting third party in block 314, generally over a secure connection.

In an embodiment of the transparent encryption architecture, regular expressions are used to identify fields containing sensitive user information. For example, the regular expression "^___.*" is used to match any string that begins with "___", such as ___password. Other forms of identifying sensitive fields, however, are also possible.

Transparent encryption can be applied to various messages in the HTTP protocol including, but not limited to, POST messages, GET messages, and HTML responses. The examples described herein illustrate the application of transparent encryption to HTML-encoded data. The same mechanism can be applied to other encodings, such as XML-encoded data, or data encoded in other formats, such as in other mark-up language formats.

An example application of transparent encryption includes POST ENCRYPT operations, wherein a POST body is received from a client of the form "&___password=mysecretpassword&___
        password_op=ENCRYPT&___
        password_key=bank_key&___
        password_rewrite=pwd", but is not so limited. The "___password" field portion supplies the user password. The "___" portion indicates that this field is to be processed by the TE Appliance. The field portion including "___password_op=ENCRYPT" indicates that the data in the "___password" fields is to be encrypted. The field portion including "___password_key=bank_key" provides the key name for use in encrypting the password. The field portion including "___password_rewrite=pwd" indicates that after transparent encryption processing, the field name changes from "___password" to "pwd". Following transparent encryption processing the POST request body of an embodiment has the form "pwd=AI24FFC9B306BI234AE".

An example application of transparent encryption further includes POST DECRYPT operations, wherein a POST body is received from a client of the form "&___password=A124FFC9B306B1234AE&___
        password_op=DECRYPT&___
        password_rewrite=pwd", but is not so limited. The "___password" field portion supplies the user password. The "___" portion indicates that this field is to be processed by the TE Appliance. The field portion including "___password_op=DECRYPT" indicates that the data in the"___password" fields is to be decrypted. The field portion including "___password_rewrite=pwd" indicates that after transparent encryption processing, the field name changes from "___password" to "pwd". Following transparent encryption processing the POST body of an embodiment is of the form "pwd=mysecretpassword". It is noted that there is no need for a "___password_key" field since the cyphertext generated during the POST ENCRYPT operation identifies the key used to create the cyphertext.

An example application of transparent encryption also includes GET operations, wherein an original request is of the form "GET/foo.html?___password=mysecretpassword&___
        password_op=ENCRYPT&___
        password_key=bank_key&___
        password_rewrite=password", but is not so limited. The "___password" field portion supplies the user password. The "___" portion indicates that this field is to be processed by the TE Appliance. The field portion including "___password_op=ENCRYPT" indicates that the data in the "___password" fields is to be encrypted. The field portion including "___password_key=bank_key" provides the key name for use in encrypting the password. The field portion including "___password_rewrite=pwd" indicates that after transparent encryption processing, the field name changes from "___password" to "pwd". Following transparent encryption processing the GET request body of an embodiment has the form "GET/foo.html?password=AI24FFC9B306B1234AE".

An example application of transparent encryption includes HTML responses, wherein a string similar to the POST request body is inserted inside an HTML comment. The original response from a web server is of the form "<b> credit card: </b> <!—&___creditcard=A1CDF986FBC 15456&___creditcard_op=DECRYPT&___creditcard_key=bank_key—>". It is noted that specification of an encryption key in this original response example is not required as the cyphertext of an embodiment may include encoded key identifiers. Following transparent encryption processing, the HTML response is of the form "<b>credit card:</b> 1234 4567 1234 4567", but is not so limited.

The HTML files can be rather large files, so processing of these files may slow the TE Appliance. As such, the TE Appliance allows the administrator to restrict the URLs to which HTML response filtering is applied. Therefore, the administrator provides a list of regular expressions, and any URL matching any of these regular expressions that will be processed by the TE Appliance, such as the "___" expressions noted above.

Furthermore, the administrator can specify that transparent encryption processing should only be applied to a particular number, X, of bytes of the HTML file. The number X is generally on the order of 128 bytes indicating that all fields to which TE processing should be applied reside in the first 128 bytes of the HTML file, but the embodiment is not so limited. This value can be set at a large number indicating the entire HTML file is to be searched.

With reference to FIG. 1, the TE Appliance 102 of an embodiment includes a user interface 110, but is not so limited. The user interface 110 enables the loading of symmetric encryption/decryption keys 120 onto the TE Appliance 102. It also enables the loading of public keys 120 onto the TE Appliance 102. Each key 120 is identified by a key-name.

The user interface also displays a fingerprint (hash) of all transparent encryption keys currently installed on the TE appliance. This enables a third party to apply the same hash function to the keys installed on the TE appliance, compare the hash result to previously computed and stored hash values for the stored key and verify that the correct keys are installed.

Moreover, the user interface enables a user or administrator to specify the list of fields to be processed by the TE Appliance. This is a list of regular expressions that identify Transparent Encryption fields. For example, setting "^___.*" as a delimiter implies that any field matching the regular expression "^___.*" is a Transparent Encryption field. For example, "___password" and "___creditcard" will be processed.

The user interface also allows an administrator to specify access controls to various keys installed on the module. For example, with reference to FIG. 2, the administrator is able to specify that on TE Appliance 202 the key bank-key can only be used for encryption, while on TE Appliance 204 the bank-key can only be used for decryption. Thus, sites using two TE Appliances can specify that one TE Appliance is used for encryption, while the other is used for decryption.

Transparent encryption on a TE Appliance or web security appliance has many important applications. These applications include, but are not limited to, protecting credit card numbers/information, protecting sensitive user information, protecting passwords, providing integrity for cookies, and functioning as a key server.

Figure 4:
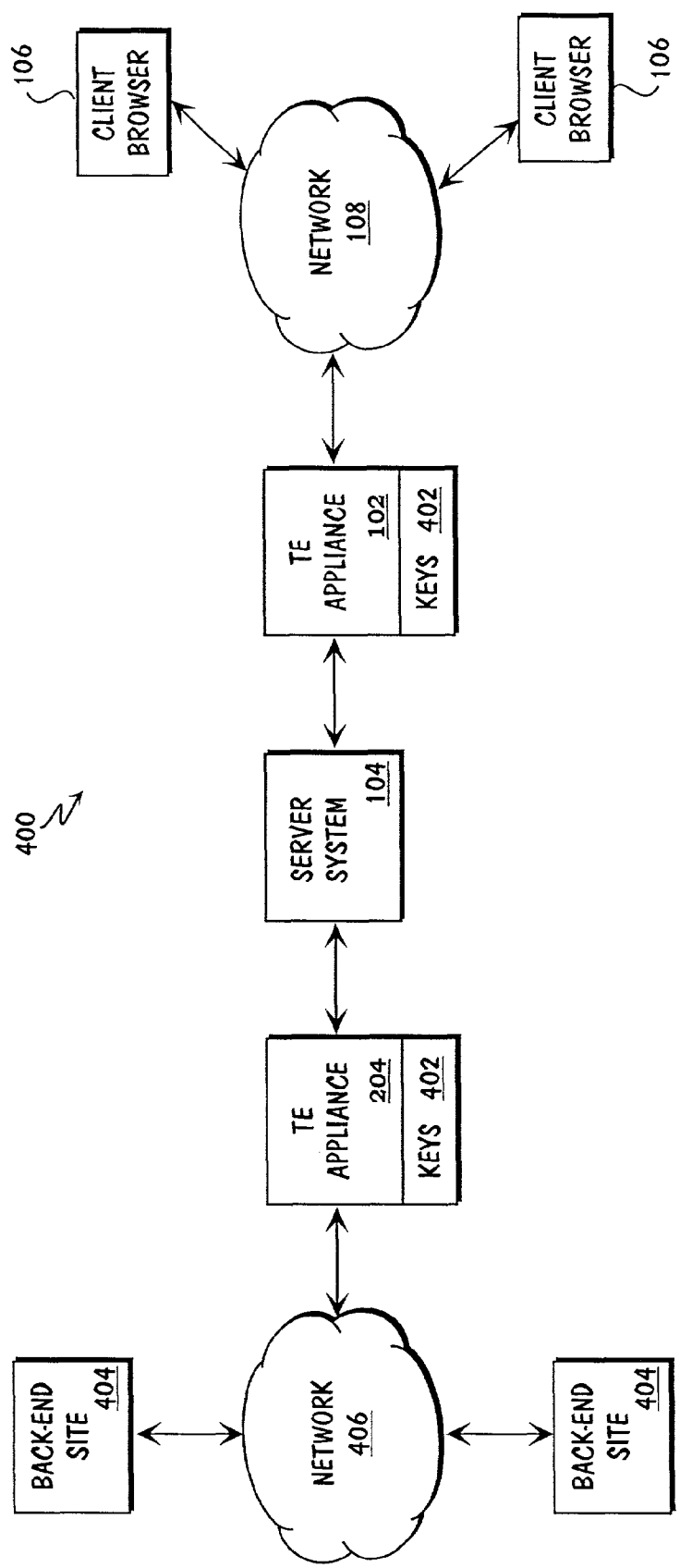
FIG. 4 is a block diagram of a system architecture 400 including one TE Appliance 102 on a site front-end, and one TE Appliance on the site back-end, under an alternate embodiment.

Protecting sensitive user information, such as credit card numbers/information and bank account numbers/information, is a most natural application for transparent encryption. FIG. 4 is a block diagram of a system architecture 400 including one TE Appliance 102 on a site front-end, and one TE Appliance on the site back-end, under an alternate embodiment.

The front-end TE Appliance 102 of an embodiment is configured to inspect all requests entering the site via the network 108 and the client browsers 106. When a user request contains sensitive user data, the TE Appliance 102 is configured to encrypt the data using one of the installed keys 402.

The server system 104 receives only the encrypted data. This encrypted data is stored in at least one database associated with the host web site 104.

The backend systems 404 connected to the server system 104 often need access to the sensitive user data. For example, with credit card numbers, the server system 104, or web site, often has to send the numbers to a financial clearing house 404 during the course of a transaction. Therefore, the server system 104 uses another TE Appliance 204 at the back-end. The back-end TE Appliance 204 of an embodiment is configured to use the installed keys 402 to decrypt all sensitive data passing through it enroute to the network 406 and back-end systems 404. This way, the credit card number is decrypted immediately before it is sent to the clearing house 404. Again, none of the host web site internal systems 104 see the unencrypted credit card number. The network 406 can be a proprietary network, or can be the same type as network 108.

Figure 5:
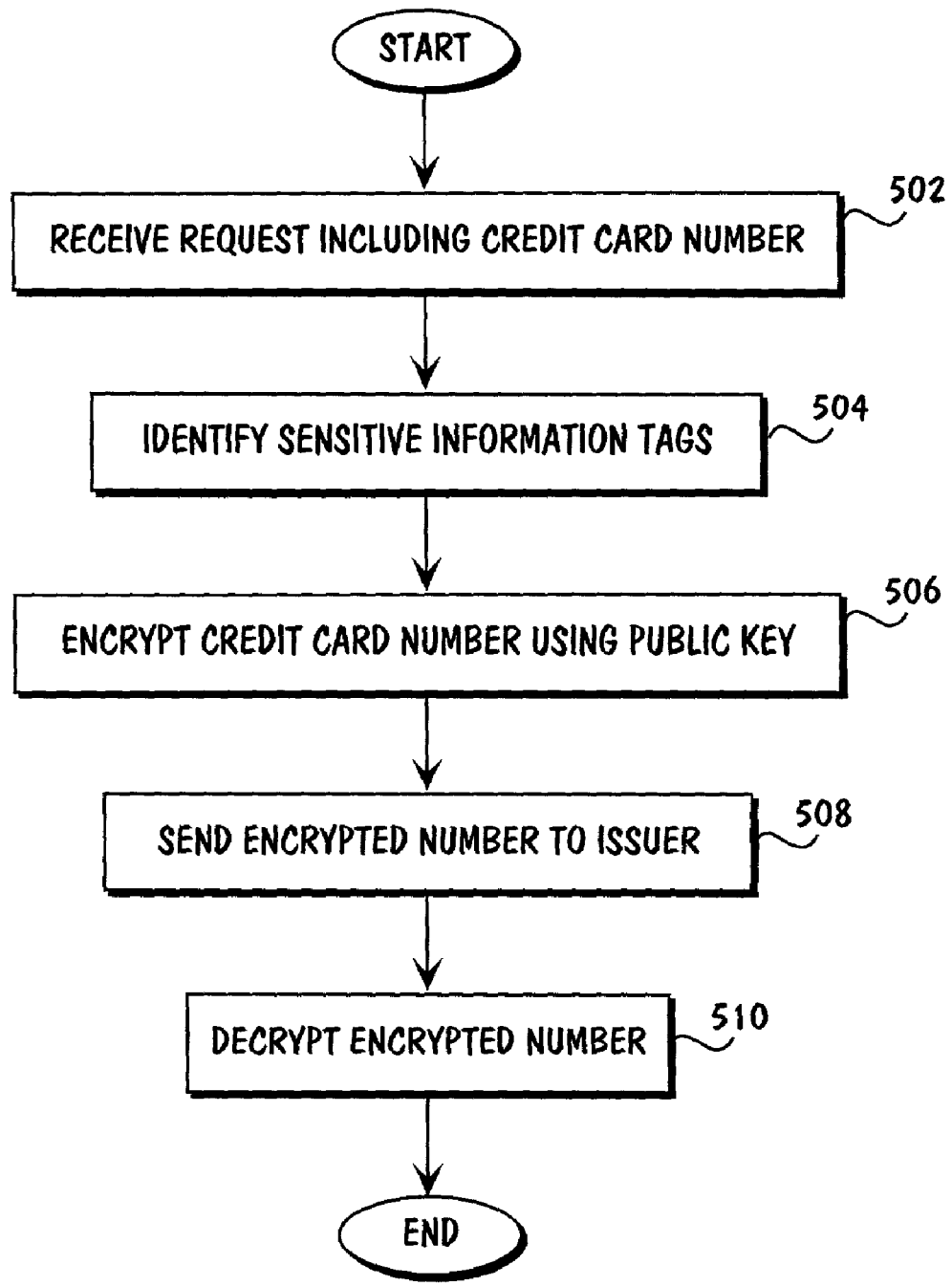
FIG. 5 is a flow diagram of transparent encryption under an alternative embodiment using a public key.

FIG. 5 is a flow diagram of transparent encryption of an alternative embodiment using a public key. The TE Appliance of the alternative embodiment receives a request including a credit card number, at block 502. The TE Appliance identifies the sensitive information tags associated with the credit card number, at block 504, and encrypts the credit card number using an issuer's, or acquirer's, public key, under block 506. The web site sends the encrypted credit card number to the issuer, at block 508, and the issuer decrypts the number, at block 510. The issuer clears the transaction using the decrypted number. In this transaction, the web site never sees credit card numbers in the clear. This eliminates the risk of hackers breaking into the site and exposing customer credit card numbers.

Figure 6:
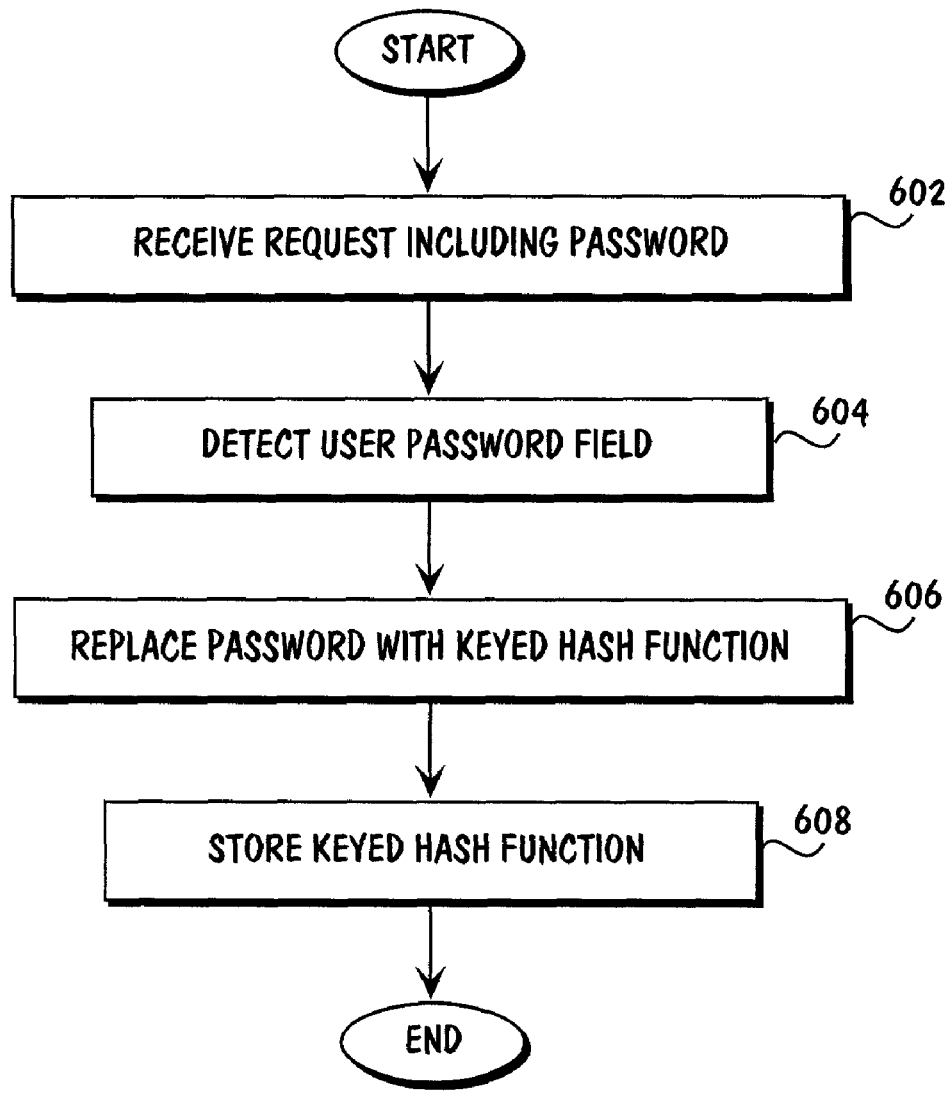
FIG. 6 is a flow diagram of transparent encryption under an alternative embodiment that protects user passwords against dictionary attacks.

FIG. 6 is a flow diagram of transparent encryption of an alternative embodiment that protects user passwords against dictionary attacks. This function is realized when a front-end TE Appliance is configured to receive, under block 602, and inspect all user requests. When the TE Appliance detects a user password field, at block 604, it replaces the actual password "pwd" with a keyed hash function of the password $H_k(pwd)$, under block 606. Any of a number of standard keyed hash functions (also known as message authentication code ("MAC") functions) can be used, for example HMAC-SHA1. The keyed hash function is stored in the server system, under block 608.

Referring to FIG. 1, the hashing key 120 is preinstalled on the TE Appliance 102, but is not so limited. The hashed password is stored in the host web site 104 database. When a user logs in, the user provides the password as part of the user's request. The TE Appliance 102 detects the password and again applies the keyed hash function to the received password. The web site 104 then compares the hashed password to the value stored in the database, and authorizes the login if the two hashes match.

As a result of using this scheme, hackers that successfully break into the database only recover hashed passwords. Hashed passwords do not assist the hacker in logging into the site. Furthermore, the hacker is not able to mount an offline dictionary attack on the hashed passwords because the hacker does not have the key or keys used by the TE Appliance to hash the passwords. Hence, the TE Appliance prevents dictionary attacks on user passwords.

The TE Appliance of an embodiment also provides integrity for HTTP cookies. Typically, the HTTP cookies are used to store state on a user's web browser. The web site can send a cookie to the user and then retrieve the cookie from the user at a later time. Unfortunately, there is no mechanism for ensuring that users do not maliciously modify cookies while they reside on the user's machine. The TE Appliance can be used to overcome this problem.

When a web site sends a cookie to the user the TE Appliance appends a checksum or MAC to the cookie. When the user sends the cookie back to the site the TE Appliance can verify the checksum/MAC. If the checksum/MAC is not verified, the TE Appliance rejects the user's request. Otherwise, it forwards the user's request into the web site.

Web site administrators frequently place all secret keys on a single server called a key server. When a processing component of the site needs to apply cryptographic operations to data (e.g., encrypt, decrypt, or MAC), the processing component contacts the key server and requests that the key server perform this task. Currently there are no standard protocols for communicating with a key server. Each site implements a site-specific mechanism.

The TE Appliance of an embodiment functions as a key server. This is accomplished by installing the site's secret keys on the TE Appliance. The site's processing components or processors then issue standard HTTP requests to the TE Appliance in order to encrypt, decrypt, or MAC specified data. The response from the TE Appliance also uses the standard HTTP protocol. Hence, the TE Appliance is a convenient way for implementing a key server using standard web protocols.

FIGS. 1 and 2 and the discussion herein provide a brief, general description of a suitable computing environment in which aspects of the invention can be implemented. Although not required, embodiments of the invention are described in the general context of computer-executable instructions, such as routines executed by a general purpose computer (e.g., a server or personal computer). Those skilled in the relevant art will appreciate that aspects of the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. Aspects of the invention can be embodied in a special purpose computer or data processor that is specifically programmed, configured or constructed to perform one or more of the computer-executable instructions explained in detail below. Indeed, the term "computer," as used generally herein, refers to any of the above devices, as well as any data processor. Further, the term "processor" as generally used herein refers to any logic processing unit, such as one or more central processing units (CPUs), digital signal processors (DSPs), application-specific integrated circuits (ASIC), etc.

Aspects of the invention can also be practiced in distributed computing environments where certain tasks or modules are performed by remote processing devices and which are linked through a communications network, such as a Local Area Network ("LAN"), Metropolitan Area Network ("MAN"), Wide Area Network ("WAN"), or the Internet. In a distributed computing environment, program modules or sub-routines may be located in both local and remote memory storage devices. Aspects of the invention described herein may be stored or distributed on computer-readable media, including magnetic and optically readable and removable computer disks, hard-wired or preprogrammed in chips (e.g., EEPROM semiconductor chips), as well as distributed electronically over the Internet or over other networks (including wireless networks). Those skilled in the relevant art will recognize that portions of the invention reside on a server computer, while corresponding portions reside on a client computer. Data structures and transmission of data particular to aspects of the invention are also encompassed within the scope of the invention. In general, while hardware platforms, such as the personal computers and remote computers, are described herein, aspects of the invention are equally applicable to nodes on a network having corresponding resource locators to identify such nodes.

The elements and acts of the various embodiments described above can be combined to provide further embodiments. In general, alternatives and alternative embodiments described herein are substantially similar to previously described embodiments, and common elements and acts or functions are identified by the same reference numbers. Only significant differences in construction or operation are described in detail.

One skilled in the relevant art will appreciate that the concepts of the invention can be used in various environments other than the Internet. For example, the concepts can be used in any electronic transaction environment. In general, a display description may be in HTML format, email format or any other format suitable for displaying information (including character/code-based formats, algorithm-based formats (e.g., vector generated), and bitmapped formats). Also, various communication channels may be used, such as a local area network, metropolitan area network, wide area network, or a point-to-point dial-up connection instead of the Internet. The server system may comprise any combination of hardware or software that can support these concepts. In particular, a web server may actually include multiple computers. A client system may comprise any combination of hardware and software that interacts with the server system. The client systems may include television-based systems, Internet appliances and various other consumer products through which transactions may be conducted, such as wireless computers (palm-based, wearable, mobile phones, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below" and words of similar import, when used in this application, shall refer to this application as a whole and not to any particular portions of this application.

The description herein of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize.

All of the references and U.S. patents and applications referenced herein are incorporated herein by reference. Aspects of the invention can be modified, if necessary, to employ the systems, functions and concepts of the various patents and applications described herein to provide yet further embodiments of the invention.

These and other changes can be made to the invention in light of the detailed description herein. In general, in the following claims, the terms used should not be construed to limit the invention to the specific embodiments disclosed in the specification and the claims, but should be construed to include all electronic systems that operate under the claims to provide secure electronic transactions. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What we claim is:

1. A transparent encryption appliance that does not store data for protecting data received from a web stored in a database by a web server environment, the transparent encryption appliance comprising:

at least one client interface for coupling to at least one network and communicating with one or more clients via the at least one network;

a server interface for coupling to the web server environment;

wherein the appliance is separate from the web server environment and is operative to be connected between the web server environment and the at least one network, wherein the server interface and the at least one client interface communicate using same communications protocol; and a processor coupled to the at least one client interface and the server interface for at least one of securing and unsecuring data, wherein:

securing data comprises: evaluating a data transaction received through the at least one client interface; identifying first sensitive data contained in said data transaction; securing only the first sensitive data by at least one of encrypting, hashing, and keyed hashing; replacing in the data transaction the identified first sensitive data with the secured first sensitive data; and providing the data transaction including the secured first sensitive data through the web server interface; and unsecuring data comprises: responsive to a request received through the at least one client interface for second sensitive data corresponding to at least a portion of the stored secured first sensitive data or other stored secured sensitive data, receiving through the web server interface the secured second sensitive data corresponding to the requested data; unsecuring the received secured second sensitive data by at least one of decrypting and hash verifying; and providing the unsecured second sensitive data through the at least one client interface.

2. The appliance of claim 1, wherein:

in securing data the data transaction is received through a first said client interface; and in unsecuring data the request is received, and the unsecured second sensitive data is provided, through the first said client interface or a second said client interface.

3. The appliance of claim 1, wherein the processor manages SSL traffic and handles computations that support SSL connections, wherein at least one of:

in securing data the data transaction is received via a first SSL connection and SSL computations are completed before identifying the first sensitive data contained in the data transaction; and in unsecuring data the unsecured second sensitive data is provided via a second SSL connection.

4. The appliance of claim 1, wherein the received data transaction is one of a cleartext transaction and a Hypertext Transfer Protocol (HTTP) transaction.

5. The appliance of claim 1, wherein the at least one network is at least one of the Internet, a wired network type, a wireless network type, a hybrid network type, an independent network, a proprietary network, or a back plane network.

6. The appliance of claim 1, further comprising a key storage for storing at least one cryptographic key for use in at least one of the securing and unsecuring of data.

7. The appliance of claim 6, further comprising a user interface for use in loading the at least one key into the key storage.

8. The appliance of claim 7, wherein the user interface is further for use in specifying access controls to the stored keys.

9. The appliance of claim 1, further comprising a user interface for use in specifying one or more fields containing the sensitive data.

10. The appliance of claim 9, wherein the one or more fields are identified by one or more regular expressions.

11. The appliance of claim 1, wherein the appliance secures and unsecures web cookies provided by the web server environment, wherein:
   securing a cookie comprises: identifying a cookie received through the server interface; securing the cookie by at least one of encrypting, hashing, and keyed hashing the cookie; and providing the secured cookie to one of the one or more clients through the at least one client interface without providing means to the client to unsecure the cookie, wherein the secured cookie is stored in the client; and
   unsecuring the cookie comprises: responsive to a request received through the server interface for the cookie stored on a client, receiving from the client the secured cookie corresponding to the requested cookie through the at least one client interface; unsecuring the received secured cookie by at least one of decrypting and hash verifying; and providing the unsecured cookie through the server interface.

12. A system for protecting data stored in a web server environment, comprising:
   at least one client coupled to at least one network;
   the web server environment that stores data received from a web in at least one database and does not secure by encrypting, hashing, or keyed hashing the data received from the web before the data is stored; and
   a transparent encryption appliance separate from the web server environment and connected between the web server environment and said at least one network that does not store data for protecting the data stored in the web server environment, comprising:
   at least one client interface coupled to the at least one network and communicating with the at least one client via the at least one network;
   a server interface coupled to the web server environment, wherein the server interface and the at least one client interface communicate using same communications protocol; and
   a processor coupled to the at least one client interface and the server interface for at least one of securing and unsecuring data, wherein:
   securing data comprises: inspecting a data transaction received through the at least one network interface; identifying first sensitive data contained in said data transaction; securing only the first sensitive data by at least one of encrypting, hashing, and keyed hashing; replacing in the data transaction the identified first sensitive data with the secured first sensitive data; and providing the data transaction including the secured first sensitive data to the web server environment, wherein the secured first sensitive data is stored in said at least one database by the web server environment; and
   unsecuring data comprises: responsive to a request received through the at least one network interface for second sensitive data corresponding to at least a portion of the stored secured first sensitive data or other stored secured sensitive data, receiving from the web server environment the secured second sensitive data corresponding to the requested second sensitive data retrieved from said at least one database by the web server environment; unsecuring the received secured second sensitive data by at least one of decrypting and hash verifying; and providing the unsecured second sensitive data through the at least one client interface.

13. The system of claim 12, wherein the processor of the appliance manages SSL traffic and handles computations that support SSL connections, wherein at least one of:
   in securing data the data transaction is received via a first SSL connection and SSL computations are completed before identifying the first sensitive data contained in the data transaction; and
   in unsecuring data the unsecured second sensitive data is provided via a second SSL connection.

14. The system of claim 12, wherein the data transaction received by the appliance is one of a cleartext transaction and a Hypertext Transfer Protocol (HTTP) transaction.

15. The system of claim 12, wherein the appliance further comprises a key storage for storing one or more cryptographic keys for use in at least one of the securing and unsecuring of data.

16. The system of claim 15, wherein the appliance further comprises a user interface for use in loading the one or more keys into the key storage and specifying access controls to the stored one or more keys.

17. The system of claim 12, wherein the appliance further comprises a user interface for use in specifying one or more fields containing the sensitive data, wherein the one or more fields are identified by one or more regular expressions.

18. The system of claim 12, wherein the appliance further secures and unsecures web cookies provided by the web server environment, wherein:
   securing a cookie comprises: identifying a cookie received through the server interface; securing the cookie by at least one of encrypting, hashing, and keyed hashing the cookie; and providing the secured cookie to one of the one or more clients through the at least one client interface without providing means to the client to unsecure the cookie, wherein the secured cookie is stored in the one client; and
   unsecuring the cookie comprises: responsive to a request received through the server interface for the cookie, receiving the secured cookie corresponding to the requested cookie through the at least one client interface; unsecuring the received secured cookie by at least one of decrypting and hash verifying; and providing the unsecured cookie through the server interface.

19. A system for protecting stored passwords, comprising:
   one or more clients coupled to at least one network;
   a web server environment that stores data received from a web and does not secure by encrypting, hashing, or keyed hashing the data received from the web before the data is stored; and
   a transparent encryption appliance separate from the web server environment and connected between the at least one network and the web server environment and operative to protect passwords contained in the data stored in the web server environment, comprising:

at least one client interface coupled to the at least one network and communicating with the one or more clients via the at least one network;

a server interface coupled to the web server environment, wherein the server interface and the at least one client interface communicate using same communications protocol; and a processor coupled to the at least one client interface and the server interface for securing passwords, wherein securing a password comprises identifying a password contained in a data transaction received through the at least one client interface; securing the password by at least one of encrypting, hashing, and keyed hashing, while not securing the transaction as a whole; replacing in the data transaction the identified password with the secured password; and providing the data transaction including the secured password to the web server environment;

wherein, responsive to a request received through the at least one client interface of the appliance for an action requiring authorization and containing a password, the appliance secures the password contained in the request, while not securing the request as a whole, and provides the request including the secured password to the web server environment; the web server environment obtains the secured password from the provided request, retrieves a secured password previously secured by the appliance and stored by the web server, compares the obtained secured password to the retrieved previously stored secured password, and authenticates the action requiring authorization in the case the obtained secured password matches the retrieved previously stored secured password.

20. A method of protecting data stored in a web server that does not secure data by encrypting, hashing, or keyed hashing, comprising:

receiving from a client coupled to a network by a transparent encryption appliance that does not store data a data transaction containing first sensitive data, the transparent encryption appliance being separate from the web server and connected between the network and the web server, wherein the transparent encryption appliance comprises at least one client interface coupled to the at least one network and communicating with the at least one client via the at least one network, and a server interface coupled to the web server, wherein the server interface and the at least one client interface communicate using same communications protocol;

securing only the first sensitive data by: inspecting the data transaction; identifying the first sensitive data contained in said data transaction; securing only the identified first sensitive data using a processor coupled to the at least one client interface and the server interface by at least one of encrypting, hashing, and keyed hashing; replacing in the data transaction the identified first sensitive data with the respective secured first sensitive data; and providing the data transaction including the secured first sensitive data to the web server; and storing the provided secured sensitive data in a database by the web server, wherein the web server does not secure by encrypting, hashing, or keyed hashing the data received from the web before the data is stored; and unsecuring secured sensitive data by: responsive to a request for second sensitive data corresponding to at least a portion of the stored secured first sensitive data or other stored secured sensitive data, retrieving from the database by the web server the secured sensitive data corresponding to the requested second sensitive data; forwarding the retrieved secured sensitive data to the transparent encryption appliance; unsecuring the received secured data using the processor by at least one of decrypting and hash verifying; and providing the unsecured second sensitive data to fulfill the request.

21. A non-transitory computer readable storage medium storing executable instructions which, when executed in a computer, protect sensitive information stored in a web server by a method comprising:

receiving from a client coupled to a network by a transparent encryption appliance that does not store data a data transaction containing first sensitive data, wherein the transparent encryption appliance comprises at least one client interface coupled to the at least one network and communicating with the at least one client via the at least one network, and a server interface coupled to the web server, wherein the server interface and the at least one client interface communicate using same communications protocol;

inspecting the data transaction;

identifying the first sensitive data contained in said data transaction;

securing only the identified first sensitive data by at least one of encrypting, hashing, and keyed hashing using a processor of the computer;

replacing in the data transaction the identified first sensitive data with the respective secured first sensitive data;

providing the data transaction including the secured first sensitive data to a web server that is separate from the transparent encryption appliance and that does not secure the data received by encrypting, hashing, or keyed hashing before the data is stored;

storing the provided secured sensitive data in a database by the web server;

responsive to a request for second sensitive data corresponding to at least a portion of the stored secured first sensitive data or other stored secured sensitive data, receiving at the transparent encryption appliance from the web server the stored secured second sensitive data corresponding to the requested second sensitive data;

unsecuring the retrieved second sensitive data by at least one of decrypting and hash verifying using the processor of the computer; and providing the unsecured second sensitive data to fulfill the request.

* * * * *